US012764645B2

(12) United States Patent
Liu et al.

(10) Patent No.: US 12,764,645 B2
(45) Date of Patent: Oct. 13, 2026

(54) METHOD FOR NETWORK SLICE-BASED CELL DETERMINATION AND RELATED PRODUCTS

(71) Applicant: GUANGDONG OPPO MOBILE TELECOMMUNICATIONS CORP., LTD., Dongguan (CN)

(72) Inventors: Jianhua Liu, Dongguan (CN); Wenqiang Tian, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 658 days.

(21) Appl. No.: 18/054,764

(22) Filed: Nov. 11, 2022

(65) Prior Publication Data

US 2023/0069349 A1 Mar. 2, 2023

Related U.S. Application Data

(63) Continuation of application No. PCT/CN2020/091330, filed on May 20, 2020.

(51) Int. Cl.
*H04W 48/18* (2009.01)
*H04W 48/08* (2009.01)
*H04W 48/16* (2009.01)

(52) U.S. Cl.
CPC .......... *H04W 48/18* (2013.01); *H04W 48/08* (2013.01); *H04W 48/16* (2013.01)

(58) Field of Classification Search
CPC ..... H04W 48/08; H04W 48/16; H04W 48/18; H04W 48/20; H04W 36/0061; H04W 36/00835
See application file for complete search history.

(56) References Cited

U.S. PATENT DOCUMENTS

| | | | | |
|---|---|---|---|---|
| 11,026,121 | B2 * | 6/2021 | Shih | H04W 48/14 |
| 12,149,990 | B2 * | 11/2024 | Han | H04W 28/06 |
| 2018/0352491 | A1 | 12/2018 | Shih et al. | |
| 2019/0313473 | A1 * | 10/2019 | Kim | H04W 48/02 |
| 2020/0077280 | A1 | 3/2020 | Griot et al. | |

(Continued)

FOREIGN PATENT DOCUMENTS

| | | |
|---|---|---|
| CN | 106572516 | 4/2017 |
| CN | 107223350 | 9/2017 |
| CN | 108566309 | 9/2018 |

(Continued)

OTHER PUBLICATIONS

Universal Mobile Telecommunications System (UMTS); User Equipment (UE) procedures in idle mode and procedures for cell reselection in connected mode (3GPP TS 25.304 version 12.6.0 Release 12) (Jul. 2015) (Year: 2015).*

(Continued)

*Primary Examiner* — Wayne H Cai
(74) *Attorney, Agent, or Firm* — Hodgson Russ LLP

(57) ABSTRACT

Embodiments of the disclosure discloses a method for network slice-based cell determination and related products. The method includes the following. A terminal device determines at least one first network slice. The terminal device determines a first cell to be accessed according to the at least one first network slice.

18 Claims, 3 Drawing Sheets

(56) References Cited

U.S. PATENT DOCUMENTS

| | | | | |
|---|---|---|---|---|
| 2021/0112513 A1* | 4/2021 | Chun | .................... | H04W 60/00 |
| 2022/0417900 A1* | 12/2022 | Li | ......................... | H04W 68/02 |

FOREIGN PATENT DOCUMENTS

| | | |
|---|---|---|
| CN | 109309939 | 2/2019 |
| CN | 109565742 | 4/2019 |
| CN | 109923903 | 6/2019 |
| CN | 110679179 | 1/2020 |
| EP | 3343980 A1 | 7/2018 |
| WO | 2018199611 | 11/2018 |

OTHER PUBLICATIONS

EPO, Communication for EP Application No. 20936127.8, Feb. 28, 2024.

Intel, “Interim conclusions on Network Slicing,” SA WG2 Meeting #117, S2-165572, Oct. 2016.

WIPO, International Search Report and Written Opinion for International Application No. PCT/CN2020/091330, Feb. 22, 2021.

VIVO, “Cell selection / reselection with network slicing,” 3GPP TSG-RAN WG2 Meeting #99, R2-1708409 (revised R2-1706960), Aug. 2017.

Xiaomi, “Cell Selection and Reselection Consideration for Network Slicing,” 3GPP TSG-RAN WG2 #97bis, R2-1702530, Apr. 2017.

Huawei et al., “Slice Availability for Cell (Re-)Selection,” 3GPP TSG-RAN WG2#99, R2-1708927 (Revision of R2-1706775), Aug. 2017.

EPO, Extended European Search Report for EP Application No. 20936127.8, May 19, 2023.

CNIPA, First Office Action for CN Application No. 202310125677.7, Apr. 17, 2025.

CNIPA, Second Office Action for CN Application No. 202310125677.7, Aug. 29, 2025.

* cited by examiner

METHOD FOR NETWORK SLICE-BASED CELL DETERMINATION AND RELATED PRODUCTS

CROSS REFERENCE TO RELATED APPLICATION(S)

This application is a continuation of International Application No. PCT/CN2020/091330, filed May 20, 2020, the entire disclosure of which is incorporated herein by reference.

TECHNICAL FIELD

The disclosure relates to the technical field of communication, and in particular, to a method for network slice-based cell determination and related products.

BACKGROUND

A strong demand for wireless communication in the vertical market is obvious to all. To meet requirements of the vertical industry for delay, mobility, reliability, position accuracy, etc., a random access network (RAN) needs to enhance the support of vertical services in the access network. One way for this is based on network slicing. Network slicing is an on-demand networking method, which can separate multiple virtual end-to-end networks from a unified infrastructure. Each network slice is logically isolated on a RAN, a bearer network, and a core network (CN) to adapt to various applications, thereby providing lower latency, more targeted, more flexible, and more scalable services for various services with different requirements.

At present, the selection of a public land mobile network (PLMN) and a cell by a terminal device fails to consider the requirement of the terminal device for network slicing. Therefore, how the terminal device can access a corresponding cell by networking through a configured network slice is an open problem.

SUMMARY

In a first aspect, embodiments of the disclosure provide a method for network slice-based cell determination. The method includes the following. A terminal device determines at least one first network slice. The terminal device determines a first cell to be accessed according to the at least one first network slice.

In a second aspect, embodiments of the disclosure provide a terminal device. The terminal device includes a transceiver, a memory configured to store computer programs, and a processor configured to execute the computer programs stored in the memory to: determine at least one first network slice, and determine a first cell to be accessed according to the at least one first network slice.

In a third aspect, embodiments of the disclosure provide a network device. The network device includes a transceiver, a memory configured to store computer programs, and a processor configured to execute the computer programs stored in the memory to cause the transceiver to: transmit first information to a terminal device when receiving a first message, where the first information includes at least one piece of network slice information, the network slice information is used for the terminal device to determine at least one first network slice and determine a first cell to be accessed according to the at least one first network slice, and the first message is a location update message or a configuration update message initiated by the terminal device.

BRIEF DESCRIPTION OF THE DRAWINGS

The accompanying drawings required for description of embodiments or the related art will be briefly introduced below.

DETAILED DESCRIPTION

The following will describe technical solutions of embodiments of the present disclosure with reference to the accompanying drawings. Apparently, embodiments described herein are merely some embodiments, rather than all embodiments, of the present disclosure. Based on the embodiments of the present disclosure, all other embodiments obtained by those of ordinary skill in the art without creative effort shall fall within the protection scope of the present disclosure.

The technical solutions of embodiments of the present disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Embodiments of the present disclosure are also applicable to these communication systems.

Figure 1:
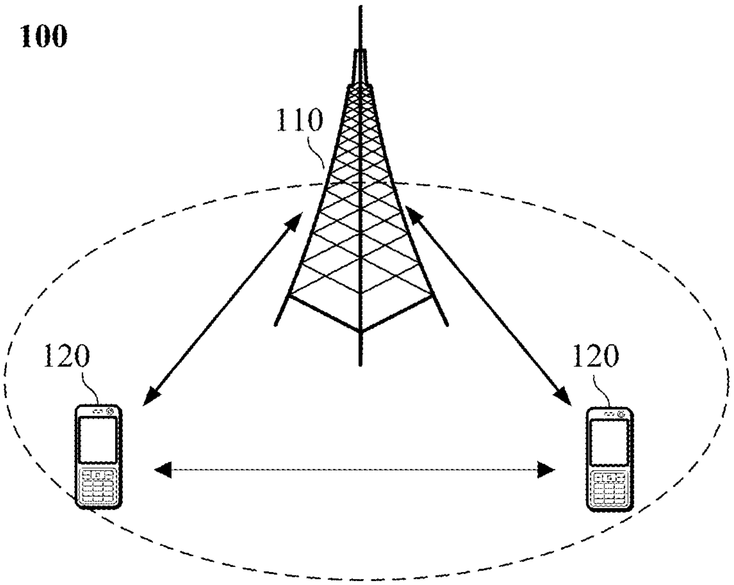
FIG. 1 is a network architecture diagram of a communication system provided in embodiments of the disclosure.

Exemplarily, as illustrated in FIG. 1, a communication system 100 may include a network device 110. The network device 110 may be a device that can communicate with a terminal device 120 (or referred to as a communication terminal or a terminal). The network device 110 can provide a communication coverage for a specific geographical area and communicate with terminal devices in the coverage area. Optionally, the network device 110 may be a base transceiver station (BTS) in the GSM or in the CDMA system, or may be a NodeB (NB) in the WCDMA system, or may be an evolutional Node B (eNB or eNodeB) in the LTE system, or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5th generation (5G) network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite or cellular telephone, a personal communication system (PCS) terminal that can combine a cellular radio telephone with data processing, fax, and data communication capabilities, a personal digital assistant (PDA) that can be a radio telephone, a pager, internet/intranet access, a web browser, a memo pad, a calendar, and/or a global positioning system (GPS) receiver, a conventional laptop and/or a palmtop receiver, or other electronic devices including a radiotelephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, the terminal devices 120 may communicate with each other through device to device (D2D) communication.

Optionally, a 5G system or 5G network may also be referred to as a NR system or NR network.

FIG. 1 exemplarily illustrates one network device and two terminal devices. Optionally, the communication system 100 may include multiple network devices, and there may be other numbers of terminal devices in a coverage area of each of the network devices, which is not limited herein.

Optionally, the communication system 100 may further include other network entities such as a network controller, a mobility management entity, or the like, which is not limited herein.

It should be understood that, in embodiments of the disclosure, a device having a communication function in a network/system may be referred to as a communication device. Taking the communication system 100 illustrated in FIG. 1 as an example, the communication device may include the network device 110 and the terminal device 120 having a communication function, and the network device 110 and the terminal device 120 may be the specific devices described above, which will not be repeated herein. The communication device may also include other devices in the communication system 100, such as a network controller, a mobility management entity, and other network entities, which is not limited herein.

It should be understood that, the terms "system" and "network" herein are usually interchangeable. The term "and/or" herein describes only an association relationship for describing associated objects and represents that three relationships may exist. For example, A and/or B may represent the following three cases: only A exists, both A and B exist, and only B exists. In addition, the character "/" herein generally indicates an "or" relationship between the associated objects.

At present, application scenarios of 5G networks mainly include enhanced mobile broadband (eMBB), ultra-reliable and low latency communications (URLLC), and massive machine type of communication (mMTC).

An NR network may be deployed independently. In 5G network environment, for reduction of air interface signaling and fast recovery of wireless connections and data services, a new radio resource control (RRC) state, i.e., an RRC_INACTIVE state is defined. The RRC_INACTIVE state is different from an RRC_IDLE state and an RRC ACTIVE state.

RRC_IDLE: There is no RRC connection, mobility is based on UE cell reselection, paging is initiated by a CN, a paging area is configured by the CN, and there is no UE access stratum (AS) context information on the network device side.

RRC_CONNECTED: The RRC connection exists, the UE AS context information exits in the network device and the UE, the network device side is aware of a location of the UE in a specific cell level, the mobility is controlled on the network device side, and unicast data can be transmitted between the UE and the network device.

RRC_INACTIVE: The mobility is based on UE cell reselection, there is a connection between the CN and an access network, the UE AS context information exists in a network device, the paging is triggered by an RAN, an RAN-based paging area is managed by the RAN, and the network device side is aware of an RAN paging area level-based location of the UE.

PLMN and Cell Selection:

There are two modes for PLMN selection, i.e., automatic mode and manual mode. In automatic mode, the UE autonomously completes PLMN search and selection according to a preset priority criterion. In manual mode, the UE presents a list of PLMNs that meet a condition to the user for the user to select. Whether in automatic mode or in manual mode, the AS layer of the UE needs to be able to report an existing list of PLMNs in the network to the non-access stratum (NAS) of the UE. To this end, the AS layer of the UE performs full-band search according to its own capabilities and settings, searches for a cell with the strongest signal at each frequency point, reads system information of the cell, and reports the system information to the NAS layer of the UE, then the NAS layer decides whether to continue the PLMN search. For a cell of an evolved universal terrestrial radio access network (E-UTRAN), a PLMN with reference signal receiving power (RSRP)>=−110 dBm is referred to as a high-quality PLMN. For a PLMN that fails to meet the high-quality condition, the AS layer of the UE needs to report a PLMN ID and a RSRP value during reporting.

If the UE finds multiple PLMNs, in automatic mode, the priority of PLMN selection may be as follows:

(1): a PLMN registered after previous power on or before leaving the service area, i.e., a registered PLMN (RPLMN);

(2): a list of home PLMNs (HPLMN) or equivalent HPLMNs (EHPLMN) in priority order;

(3): a list of PLMNs in priority order defined by the user or the operator;

(4): a high-quality PLMN; and (5): a list of non-high-quality PLMNs in RSRP order.

If the UE stores prior information, such as a carrier frequency, a cell parameter, etc., PLMN search can be optimized. The NAS layer instructs the AS layer to perform PLMN search according to the parameter in the prior information and report a result to the NAS layer.

After selecting a PLMN, the UE needs to select a suitable cell to camp on through cell selection.

Relevant parameters are broadcast in a system information block (SIB) 1 system message. A minimum access RSRP offset Qrxlevminoffset is used to reduce the ping-pong selection between PLMNs. This parameter is only available when the UE camp on a visited PLMN and periodically searches for a higher-level PLMN.

There may be the following two cases for UE cell selection:

(1): initial cell selection, where the UE does not have prior information on an evolved universal terrestrial radio access (EUTRA) carrier, in which case the UE needs to perform full-band search according to its own capabilities and settings, search for a strongest cell at each frequency point, and select a cell to camp on when the cell satisfying a cell selection criterion, i.e., S-Criterion.

(2): cell search, where information of cells is stored at the UE, in which case the UE only needs to search on these cells, determine whether these cell satisfy the S-Criterion after the search, and select a cell to camp on when the cell satisfies the S-Criterion, or otherwise the UE still needs to perform initial cell selection.

Information of the type of service provided by the cell is broadcast in relevant parameters in SIB1. When the UE performs cell selection, a selected cell needs to satisfy the following requirements:

(1): a PLMN where the cell is located needs to be one of the following: a selected PLMN, a registered PLMN, or one PLMN in a list of equivalent PLMNs;

(2): the cell is not prohibited;

(3): the cell belongs to at least one tracking area (TA) not prohibited from roaming;

(4): for a cell of a closed subscriber group (CSG), the CSG ID is included in a list of CSGs allowed by the UE; and (5): the cell satisfies the S-Criterion.

When entering the coverage area of a system, the UE performs cell search. No matter which state (connected, idle, or inactive) the UE is in, the UE will perform cell search even when the UE moves in the system, to achieve mobility.

During NR cell search, the UE searches based on a synchronization signal block (SSB). The UE performs frequency sweep on each supported frequency band in turn. The SSB is located at a set of possible positions in each frequency band. The UE searches for the SSB with a synchronization grid. After the SSB is found, the UE may obtain system information such as a cell identity and a master information block (MIB).

In addition, the UE searches for the strongest cell on all carrier frequencies in a NR frequency band. If the RSRP of the strongest cell at this frequency point is greater than or equal to −110 dBm, the UE reports the PLMN to the NAS layer as a high-quality PLMN. If the RSRP of the strongest cell at this frequency point is less than −110 dBm but the UE can read PLMN information of the cell, the UE then reports the PLMN and a corresponding RSRP value to the NAS layer. The NAS layer performs PLMN selection according to the PLMN and the corresponding RSRP value.

Network slicing in Release 15 (Rel-15) only involves the CN side. Specifically, the UE reports a slicing requirement, and the network selects a suitable MAF according to the slicing requirement reported by the UE to establish a service session between the UE and the network device. In Release 17 (Rel-17), enhancement of slice slicing by the access network is introduced.

Figure 2:
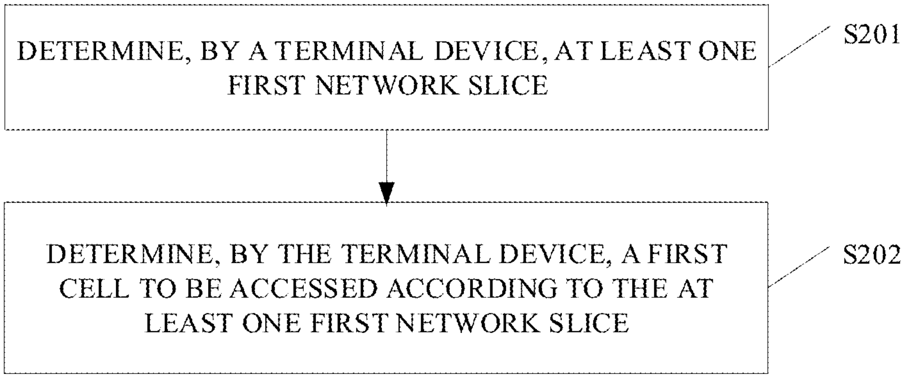
FIG. 2 is a schematic flowchart of a method for network slice-based cell determination provided in embodiments of the disclosure.

Referring to FIG. 2, FIG. 2 illustrates a method for network slice-based cell determination provided in embodiments of the disclosure. The method is applicable to the communication system mentioned above and includes some or all of the following operations.

At S201, a terminal device determines at least one first network slice.

In a possible example, the terminal device determines the at least one first network slice as follows. The terminal device determines the at least one first network slice preconfigured, determines the at least one first network slice according to a selection operation of a user, or selects the at least one first network slice according to a priority of each of multiple network slices preconfigured.

The at least one first network slice may include one or more first network slices. When the at least one first network slice includes multiple first network slices, the at least one first network slice determined by the terminal device is represented as a list of network slices, and the list may contain a priority of each first network slice.

The terminal device may specifically determine the at least one first network slice according to the selection operation of the user as follows. The user selects at least one first network slice from multiple network slices, or the user selects a first service and the terminal device determines the at least one first network slice according to the first service, which is not limited herein.

As can be seen, in this example, the terminal device can determine the at least one first network slice in various ways, which helps to improve the diversity of the determination of a cell to be accessed by the terminal device.

At S202, the terminal device determines a first cell to be accessed according to the at least one first network slice.

Optionally, the terminal device accesses the first cell.

As can be seen, in embodiments of the disclosure, the terminal device determines the at least one first network slice, and determines the first cell to be accessed according to the at least one first network slice. As can be seen, the terminal device selects the first cell to be accessed according to the first network slice determined, which realizes network slice-based wireless communication, helps to improve the targeting of cell access, optimizes the wireless communication of the terminal device, and refines the utilization of network resources.

In a possible example, the terminal device determines the first cell to be accessed according to the at least one first network slice as follows. A NAS layer of the terminal device transmits indication information corresponding to the at least one first network slice to an AS layer. The AS layer of the terminal device performs cell search according to the indication information to obtain a first search result. The AS layer of the terminal device determines the first cell according to the first search result and feeds back the first cell to the NAS layer. The NAS layer of the terminal device determines the first cell as a cell to be accessed.

The indication information includes a radio access technology (RAT) and frequency information corresponding to each first network slice. That is, the indication information may be a list of RATs and frequency information, and the order of each set of RAT and frequency information in the list corresponds to the priority order of the at least one first network slice.

The indication information is determined by the NAS layer of the terminal device by querying a first mapping relationship according to the at least one first network slice, and the first mapping relationship is a mapping relationship between network slices, RATs, and frequencies.

The AS layer of the terminal device may perform cell search according to the indication information as follows. The AS layer may perform cell search at a specific frequency based on a RAT in the indication information, and determine a cell that matches the indication information as the first search result.

Specifically, when the at least one first network slice includes multiple first network slices, the AS layer performs cell search according to the priorities of multiple sets of RATs and frequency information in the indication information. For example, the AS layer first performs cell search according to a RAT and frequency information with the highest priority, and stops the search when an accessible cell is found. If no accessible cell is found, the AS layer performs cell search according to a next set of RAT and frequency information in priority order, until an accessible cell is found, or until the search is performed for all RATs and frequency information in the indication information.

The first cell may be a high-quality cell, i.e., a cell with RSRP>=−110 dBm selected by the AS layer from multiple cells in the first search result, which is not limited herein.

As can be seen, in this example, the terminal device performs cell search according to the specific indication information for the first network slice, which helps to save the time for the terminal device to find a cell suitable for the first network slice, and saves the power consumption of the terminal.

In this possible example, the AS layer of the terminal device determines the first cell according to the first search result and feeds back the first cell to the NAS layer as follows. The AS layer of the terminal device determines the first cell according to the first search result. The AS layer of the terminal device reads SIB information of the first cell. The AS layer of the terminal device feeds back the first cell and information of a second network slice corresponding to the first cell in the SIB information to the NAS layer.

The AS layer selects a high-quality cell that supports network slicing according to the first search result.

The information of the second network slice corresponding to the first cell may be used for the terminal device to select a corresponding network slice in a next random access procedure.

As can be seen, in this example, when feeding back the first cell to the NAS layer, the AS layer of the terminal device also feeds back the information of the second network slice corresponding to the first cell to the NAS layer, which helps to save the time for the next random access procedure.

In a possible example, after the AS layer of the terminal device performs the cell search according to the indication information, the method further includes the following. The AS layer of the terminal device feeds back a second search result of the cell search to the NAS layer, where the second search result is that no cell satisfying the indication information is found.

In this possible example, after the AS layer of the terminal device feeds back the second search result of the cell search to the NAS layer, the method further includes the following. The NAS layer of the terminal device determines a third network slice, and transmits indication information corresponding to the third network slice to the AS layer, where a priority of the third network slice is lower than a priority of the first network slice.

The third network slice may be a network slice among multiple network slices preconfigured in the terminal device which has a lower priority than the first network slice.

The indication information corresponding to the third network slice is used for the AS layer to continue searching for a cell satisfying the indication information according to the indication information to feed back to the NAS layer.

As can be seen, in this example, when no cell satisfying the requirement is found by the terminal device according to the indication information corresponding to the first network slice, the terminal device selects the third network slice with low priority to continue the cell search, which helps to ensure that the terminal device can access a cell.

In a possible example, the terminal device determines the first cell to be accessed according to the at least one first network slice as follows. The NAS layer of the terminal device transmits the at least one first network slice to the AS layer. The AS layer of the terminal device performs cell search. The AS layer of the terminal device submits a first reference cell as a third search result to the NAS layer when the first reference cell supporting the at least one first network slice is found. The NAS layer of the terminal device determines the first cell to be accessed according to the third search result.

The AS layer of the terminal device may specifically perform the cell search by performing network-wide search.

The first reference cell may be a cell with highest quality found by the AS layer, or the first reference cell may include multiple cells to feed back to the NAS layer, and the NAS layer determines the first cell among the multiple cells.

As can be seen, in this example, the terminal device selects a cell supporting the first network slice based on the determination of the AS layer and directly feeds back the cell to the NAS layer, which helps to improve the speed of cell access and reduce the power consumption of the terminal device for cell access.

In this possible example, the method further includes the following. The NAS layer of the terminal device transmits indication information corresponding to the at least one first network slice to the AS layer. The AS layer of the terminal device performs the cell search as follows. The AS layer of the terminal device performs the cell search according to the indication information.

The indication information is the same as the indication information described above, which will not be repeated herein.

As can be seen, in this example, after transmitting the at least one first network slice to the AS layer, the terminal device transmits the indication information to the AS layer, so that the AS layer can perform cell search according to the indication information to search for the first reference cell supporting the at least one first network slice, which helps to save the time for cell search and reduce the consumption.

In a possible example, the third search result includes PLMN information supported by the first reference cell, and the NAS layer of the terminal device determines the first cell to be accessed according to the third search result as follows. The NAS layer of the terminal device determines whether the PLMN information supported by the first reference cell is a first type of PLMN. The NAS layer of the terminal device determines the first reference cell as the first cell to be accessed, if the PLMN information supported by the first reference cell is the first type of PLMN.

The first type of PLMN is a PLMN allowed by the terminal device.

When it is determined that the PLMN information supported by the first reference cell is not the first type of PLMN, the cell is not selected to camp on, and then the NAS layer may notify the AS layer to perform cell search again.

As can be seen, in this example, the NAS layer of the terminal device determines, according to the PLMN information supported by the first reference cell fed back by the AS layer, whether the PLMN information is PLMN information allowed by the terminal device, and only when the PLMN is an allowed PLMN can the cell be determined as the first cell to be accessed, which helps to improve the success rate of cell access.

In a possible example, after the AS layer of the terminal device performs the cell search, the method further includes the following. The AS layer of the terminal device feeds back a fourth search result of the cell search to the NAS layer, where the fourth search result is that no cell supporting the at least one first network slice is found.

In a possible example, the terminal device determines the first cell to be accessed according to the at least one first network slice as follows. The NAS layer of the terminal device transmits a first instruction to the AS layer. The AS layer of the terminal device performs cell search according to the first instruction. The AS layer of the terminal device reads SIB information of a second reference cell found and feeds back a fifth search result to the NAS layer, where the fifth search result includes the second reference cell and corresponding network slice information. The NAS layer of the terminal device determines the first cell to be accessed according to the at least one first network slice and the fifth search result.

The first instruction is used to instruct the AS layer to perform cell search. Under the first instruction, the AS layer performs network-wide search to search for the second reference cell that supports the network slicing technology.

In this possible example, the first instruction further includes indication information corresponding to the at least one first network slice.

When the first instruction includes the indication information, the AS layer can perform cell search according to the indication information to save the time for cell search.

As can be seen, in this example, the NAS layer of the terminal device directly instructs the AS layer to perform cell search, so that the determined first cell to be accessed satisfies the at least one first network slice and is compatible with the related art, which helps to reduce the need for device changes and reduce costs.

In a possible example, the NAS layer of the terminal device determines the first cell to be accessed according to the at least one first network slice and the fifth search result as follows. The NAS layer of the terminal device detects whether the at least one first network slice matches the network slice information of the second reference cell. The NAS layer of the terminal device determines the second reference cell as the first cell if the at least one first network slice matches the network slice information of the second reference cell.

The matching between the at least one first network slice and the network slice information of the second reference cell refers to that the network slice information of the second reference cell is the same as any one of the at least one first network slice.

As can be seen, in this example, the terminal device determines whether to select the second reference cell as the first cell to be accessed through a network slice matching process, which helps to reduce the algorithm complexity and improve the speed of cell access.

In this possible example, after the NAS layer of the terminal device detects whether the at least one first network slice matches the network slice information of the second reference cell, the method further includes the following. The NAS layer of the terminal device transmits a second instruction to the AS layer when detecting that the at least one first network slice fails to match the network slice information of the second reference cell, where the second instruction is used for the AS layer to select a third reference cell according to the second instruction to feed back to the NAS layer.

As can be seen, in this example, after the matching of network slice fails, the terminal device notifies the AS layer to perform cell search again, thereby ensuring the timeliness and the success rate of cell access.

In a possible example, the fifth search result further includes PLMN information supported by the second reference cell.

In this possible example, the NAS layer of the terminal device determines the first cell to be accessed according to the at least one first network slice and the fifth search result as follows. The NAS layer of the terminal device determines the second reference cell as the first cell when detecting that the at least one first network slice matches the network slice information of the second reference cell and the PLMN information supported by the second reference cell is not a second type of PLMN information or is a first type of PLMN information. The NAS layer of the terminal device determines the second reference cell as the first cell according to first configuration information when detecting that the at least one first network slice fails to match the network slice information of the second reference cell or the PLMN information supported by the second reference cell is the second type of PLMN information or is not the first type of PLMN information.

The second type of PLMN information is PLMN information prohibited by the terminal device.

In this possible example, the first configuration information indicates information of a network slice that the terminal device is allowed to perform on a second type of PLMN, or the first configuration information is a priority relationship between a network slice and a PLMN.

The second reference cell may be specifically determined as the first cell according to the first configuration information as follows. When it is detected that the at least one first network slice matches the network slice information of the second reference cell, but the PLMN information supported by the second reference cell is the second type of PLMN information or is not the first type of PLMN information, the second reference cell may be determined as the first cell if it is determined according to the first configuration information that the at least one first network slice includes a network slice indicated in the first configuration information that is allowed to perform on the second type of PLMN, or the second reference cell may be determined as the first cell according to the priority relationship between the network slice and the PLMN. Specifically, when the priority of the network slice is higher than the priority of the PLMN, the at least one first network slice matches the network slice information of the second reference cell, but the PLMN information supported by the second reference cell is the second type of PLMN information or is not the first type of PLMN information, the second reference cell may be determined as the first cell, or when the priority of the network slice is lower than the priority of the PLMN, the at least one first network slice fails to match the network slice information of the second reference cell, but the PLMN information supported by the second reference cell is not the second type of PLMN information or is the first type of PLMN information, the second reference cell may be determined as the first cell.

As can be seen, in this example, the terminal device determines the first cell to be accessed by matching the network slice information and the PLMN information, and when the matching fails, the first cell may be determined according to the first configuration information, thereby increasing the diversity of the determination of the first cell.

In a possible example, network slice information supported by the terminal device, a first mapping relationship, and first configuration information are preconfigured in the terminal device, or configured in the terminal device by a network device.

In a possible example, the network slice information supported by the terminal device, the first mapping relationship, and the first configuration information are transmitted by the network device to the terminal device through a registration reception message during location-update initiating of the terminal device, or are transmitted by the network device to the terminal device when receiving a configuration update message of the terminal device.

The configuration update message may be various. For example, the configuration update message may be an update message of the network slice information, or an update message of the first configuration information, etc., which is not limited herein.

The network slice information supported by the terminal device, the first mapping relationship, and the first configuration information may be transmitted by the network device to the terminal device at the same time, or may be transmitted to the terminal device at different times, which is not limited herein.

As can be seen, in this example, the network device transmits the information to the terminal device through the registration reception message during location-update initiating of the terminal device, or transmits the information to the terminal device when receiving the configuration update message of the terminal device, which helps to avoid the increase in signaling consumption, and provides an accurate basis for terminal device to select the cell to be accessed, thereby improving the accuracy of cell access.

Figure 3:
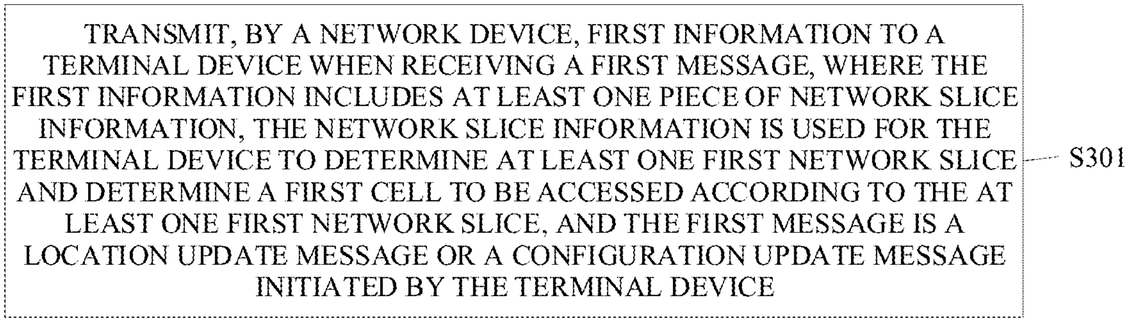
FIG. 3 is a schematic flowchart of another method for network slice-based cell determination provided in embodiments of the disclosure.

Referring to FIG. 3, FIG. 3 illustrates a method for network slice-based cell determination provided in embodiments of the disclosure. The method is applicable to the communication system mentioned above and includes some or all of the following operations.

At S301, a network device transmits first information to a terminal device when receiving a first message, where the first information includes at least one piece of network slice information, the network slice information is used for the terminal device to determine at least one first network slice and determine a first cell to be accessed according to the at least one first network slice, and the first message is a location update message or a configuration update message initiated by the terminal device.

In a possible example, the first information further includes a first mapping relationship and/or first configuration information, the first mapping relationship is a mapping relationship between network slices, RATs, and frequencies, and the first configuration information indicates service information corresponding to the at least one network slice that the terminal device is allowed to perform on a second type of PLMN, or the first configuration information is a priority relationship between a network slice and a PLMN.

As can be seen, in embodiments of the disclosure, the network device transmits the first information to the terminal device when receiving the first message, where the first information includes the at least one piece of network slice information, the network slice information is used for the terminal device to determine the at least one first network slice and determine the first cell to be accessed according to the at least one first network slice, and the first message is the location update message or the configuration update message initiated by the terminal device. As can be seen, the network device transmits the network slice information to the terminal device, so that the terminal device can determine the first cell to be accessed according to the first network slice determined, which realizes network slice-based wireless communication, helps to improve the targeting of cell access, optimizes the wireless communication of the terminal device, and refines the utilization of network resources.

Figure 4:
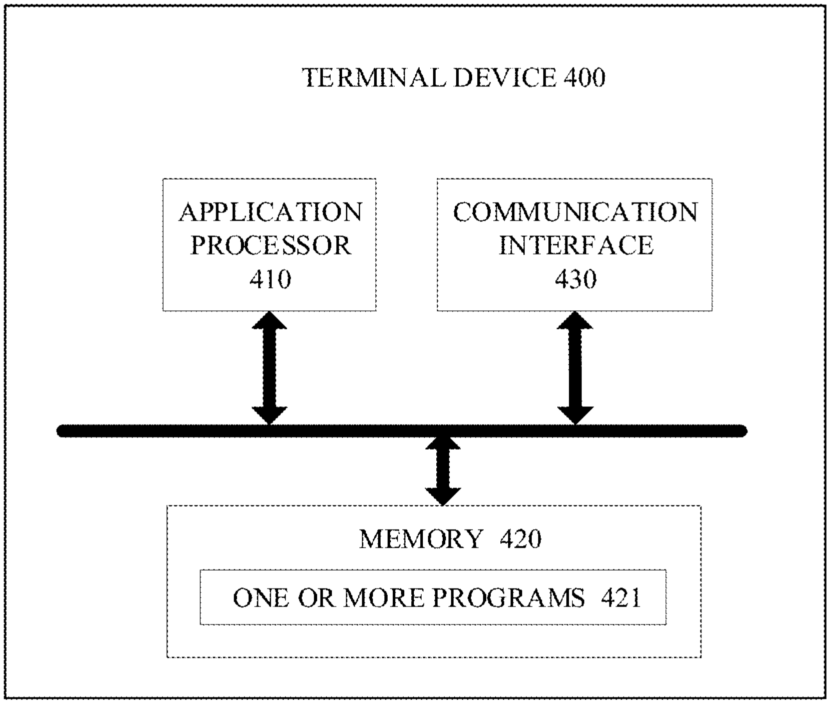
FIG. 4 is a schematic structural diagram of a terminal device provided in embodiments of the disclosure.

Consistent with above embodiments illustrated in FIG. 2, referring to FIG. 4, FIG. 4 is a schematic structural diagram of a terminal device 400 provided in embodiments of the disclosure. As illustrated in FIG. 4, the terminal device 400 includes a processor 410, a memory 420 configured to store one or more programs 421, and a communication interface 430. The one or more programs 421 are configured to be executed by the processor 410 and include instructions configured to perform the following. At least one first network slice is determined. The first cell to be accessed is determined according to the at least one first network slice.

As can be seen, in embodiments of the disclosure, the terminal device determines the at least one first network slice, and determines the first cell to be accessed according to the at least one first network slice. As can be seen, the terminal device selects the first cell to be accessed according to the first network slice determined, which realizes network slice-based wireless communication, helps to improve the targeting of cell access, optimizes the wireless communication of the terminal device, and refines the utilization of network resources.

In a possible example, in terms of determining the at least one first network slice, the instructions in the one or more programs 421 are specifically configured to perform the following. The at least one first network slice preconfigured is determined, the at least one first network slice is determined according to a selection operation of a user, or the at least one first network slice is selected according to a priority of each of multiple network slices preconfigured.

In a possible example, in terms of determining the first cell to be accessed according to the at least one first network slice, the instructions in the one or more programs 421 are specifically configured to perform the following. A NAS layer transmits indication information corresponding to the at least one first network slice to an AS layer. The AS layer performs cell search according to the indication information to obtain a first search result. The AS layer determines the first cell according to the first search result and feeds back the first cell to the NAS layer. The NAS layer determines the first cell as a cell to be accessed.

In this possible example, in terms of determining, by the AS layer, the first cell according to the first search result and feeding back the first cell to the NAS layer, the instructions in the one or more programs 421 are specifically configured to perform the following. The AS layer determines the first cell according to the first search result. The AS layer reads SIB information of the first cell. The AS layer feeds back the first cell and information of a second network slice corresponding to the first cell in the SIB information to the NAS layer.

In a possible example, the first cell is a cell that supports network slicing.

In a possible example, the instructions in the one or more programs 421 are further configured to perform the following. After the AS layer performs the cell search according to the indication information, the AS layer feeds back a second search result of the cell search to the NAS layer, where the second search result is that no cell satisfying the indication information is found.

In this possible example, the instructions in the one or more programs 421 are further configured to perform the following. After the AS layer feeds back the second search result of the cell search to the NAS layer, the NAS layer determines a third network slice, and the NAS layer transmits indication information corresponding to the third network slice to the AS layer, where a priority of the third network slice is lower than a priority of the first network slice.

In a possible example, in terms of determining the first cell to be accessed according to the at least one first network slice, the instructions in the one or more programs 421 are specifically configured to perform the following. The NAS layer transmits the at least one first network slice to the AS layer. The AS layer performs cell search. The AS layer submits a first reference cell as a third search result to the NAS layer when the first reference cell supporting the at least one first network slice is found. The NAS layer determines the first cell to be accessed according to the third search result.

In this possible example, the instructions in the one or more programs 421 are further configured to perform the following. The NAS layer transmits indication information corresponding to the at least one first network slice to the AS layer. In terms of performing, by the AS layer, the cell search, the instructions in the one or more programs 421 are specifically configured to perform the following. The AS layer performs the cell search according to the indication information.

In a possible example, the third search result includes PLMN information supported by the first reference cell, and in terms of determining, by the NAS layer, the first cell to be accessed according to the third search result, the instructions in the one or more programs 421 are specifically configured to perform the following. The NAS layer determines whether the PLMN information supported by the first reference cell is a first type of PLMN. The NAS layer determines the first reference cell as the first cell to be accessed, if the PLMN information supported by the first reference cell is the first type of PLMN.

In a possible example, the instructions in the one or more programs 421 are further configured to perform the following. After the AS layer performs the cell search, the AS layer feeds back a fourth search result of the cell search to the NAS layer, where the fourth search result is that no cell supporting the at least one first network slice is found.

In a possible example, in terms of determining the first cell to be accessed according to the at least one first network slice, the instructions in the one or more programs 421 are specifically configured to perform the following. The NAS layer transmits a first instruction to the AS layer. The AS layer performs cell search according to the first instruction. The AS layer reads SIB information of a second reference cell found and feeds back a fifth search result to the NAS layer, where the fifth search result includes the second reference cell and corresponding network slice information. The NAS layer determines the first cell to be accessed according to the at least one first network slice and the fifth search result.

In this possible example, the first instruction includes indication information corresponding to the at least one first network slice.

In a possible example, in terms of determine, by the NAS layer, the first cell to be accessed according to the at least one first network slice and the fifth search result, the instructions in the one or more programs 421 are specifically configured to perform the following. The NAS layer detects whether the at least one first network slice matches the network slice information of the second reference cell. The NAS layer determines the second reference cell as the first cell if the at least one first network slice matches the network slice information of the second reference cell.

In this possible example, the instructions in the one or more programs 421 are further configured to perform the following. After the NAS layer detects whether the at least one first network slice matches the network slice information of the second reference cell, the NAS layer transmits a second instruction to the AS layer when detecting that the at least one first network slice fails to match the network slice information of the second reference cell, where the second instruction is used for the AS layer to select a third reference cell according to the second instruction to feed back to the NAS layer.

In a possible example, the fifth search result further includes PLMN information supported by the second reference cell.

In this possible example, in terms of determining, by the NAS layer, the first cell to be accessed according to the at least one first network slice and the fifth search result, the instructions in the one or more programs 421 are specifically configured to perform the following. The NAS layer determines the second reference cell as the first cell when detecting that the at least one first network slice matches the network slice information of the second reference cell and the PLMN information supported by the second reference cell is not a second type of PLMN information or is a first type of PLMN information. The NAS layer determines the second reference cell as the first cell according to first configuration information when detecting that the at least one first network slice fails to match the network slice information of the second reference cell or the PLMN information supported by the second reference cell is the second type of PLMN information or is not the first type of PLMN information.

In this possible example, the first configuration information indicates information of a network slice that the terminal device is allowed to perform on a second type of PLMN, or the first configuration information is a priority relationship between a network slice and a PLMN.

In a possible example, the indication information includes a RAT and frequency information corresponding to each first network slices.

In a possible example, indication information is determined by the NAS layer of the terminal device by querying a first mapping relationship according to the at least one first network slice, and the first mapping relationship is a mapping relationship between network slices, RATs, and frequencies.

In a possible example, network slice information supported by the terminal device, a first mapping relationship, and first configuration information are preconfigured in the terminal device, or configured in the terminal device by a network device.

In this possible example, the network slice information supported by the terminal device, the first mapping relationship, and the first configuration information are transmitted by the network device to the terminal device through a registration reception message during location-update initiating of the terminal device, or are transmitted by the network device to the terminal device when receiving a configuration update message of the terminal device.

Figure 5:
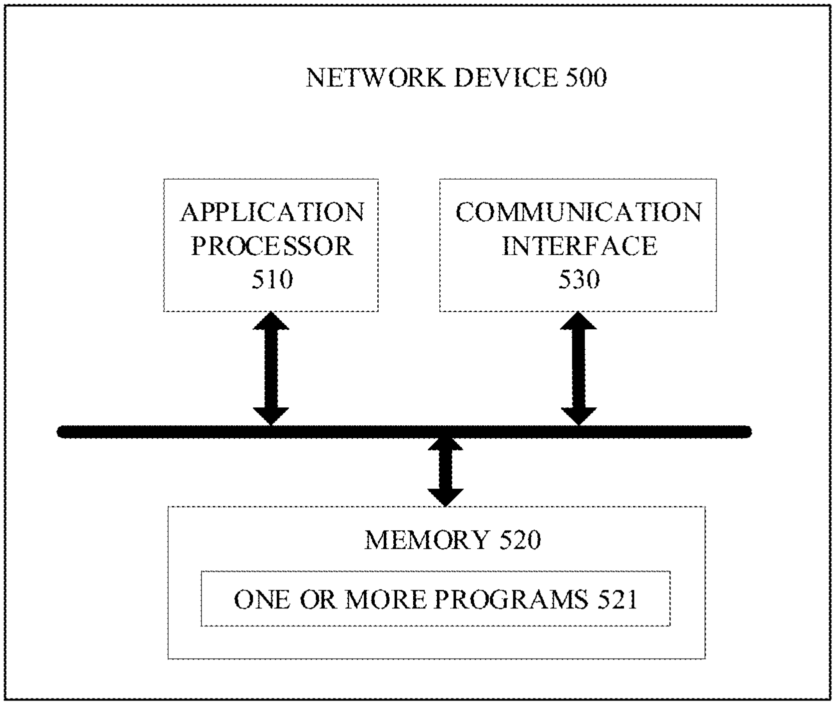
FIG. 5 is a schematic structural diagram of a network device provided in embodiments of the disclosure.

Consistent with above embodiments illustrated in FIG. 3, referring to FIG. 5, FIG. 5 is a schematic structural diagram of a network device 500 provided in embodiments of the disclosure. As illustrated in FIG. 5, the network device 500 includes a processor 510, a memory 520 configured to store one or more programs 521, and a communication interface 530. The one or more programs 521 are configured to be executed by the processor 510 and include instructions configured to perform the following. The network device transmits first information to a terminal device when receiving a first message, where the first information includes at least one piece of network slice information, the network slice information is used for the terminal device to determine at least one first network slice and determine a first cell to be accessed according to the at least one first network slice, and the first message is a location update message or a configuration update message initiated by the terminal device.

As can be seen, in embodiments of the disclosure, the network device transmits the first information to the terminal device when receiving the first message, where the first information includes the at least one piece of network slice information, the network slice information is used for the terminal device to determine the at least one first network slice and determine the first cell to be accessed according to the at least one first network slice, and the first message is the location update message or the configuration update message initiated by the terminal device. As can be seen, the network device transmits the network slice information to the terminal device, so that the terminal device can determine the first cell to be accessed according to the first network slice determined, which realizes network slice-based wireless communication, helps to improve the targeting of cell access, optimizes the wireless communication of the terminal device, and refines the utilization of network resources.

In a possible example, the first information further includes a first mapping relationship and/or first configuration information, the first mapping relationship is a mapping relationship between network slices, RATs, and frequencies, and the first configuration information indicates service information corresponding to the at least one network slice that the terminal device is allowed to perform on a second type of public land mobile network (PLMN), or the first configuration information is a priority relationship between a network slice and a PLMN.

Technical solutions of embodiments of the disclosure have been elaborated above from the perspective of interaction between various network elements. It can be understood that, in order to implement the above functions, the terminal device and the network device include hardware structures and/or software modules for performing respective functions. Those of ordinary skill in the art will appreciate that units and algorithmic operations of various examples described in connection with embodiments of the disclosure can be implemented by hardware or by a combination of hardware and computer software. Whether these functions are performed by means of hardware or hardware driven by computer software depends on the particular application and the design constraints of the associated technical solution. Those skilled in the art may use different methods with regard to each particular application to implement the described functionality, but such methods should not be regarded as lying beyond the scope of the disclosure.

Division of functional units of the terminal device and the network device may be implemented according to the above method embodiments in embodiments of the disclosure. For example, various functional units may be divided to be in one-to-one correspondence with each function, or two or more functions may be integrated into one processing unit. The integrated unit may be implemented in the form of hardware, or may be implemented in the form of software program module. It is to be noted that, division of units in embodiments of the disclosure is illustrative and is only a division of logical functions, and there may exist other manners of division in practice.

Figure 6:
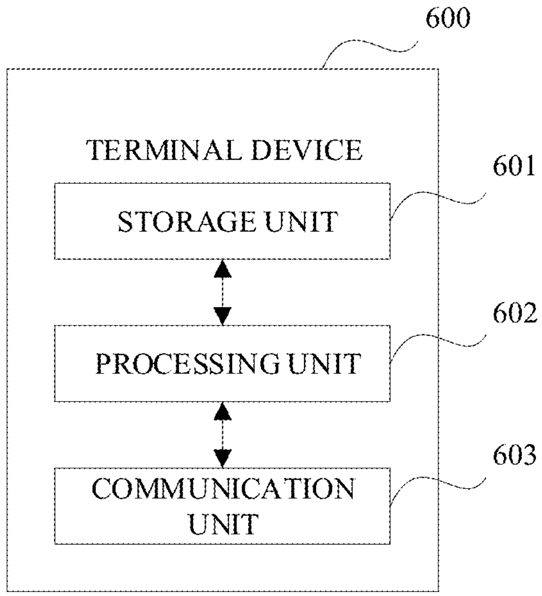
FIG. 6 is a block diagram of functional units of a terminal device provided in embodiments of the disclosure.

In the case of using the integrated unit, FIG. 6 illustrates a block diagram of possible functional units of the terminal device involved in the above embodiments. The terminal device 600 includes a processing unit 602 and a communication unit 603. The processing unit 602 is configured to control and manage operations of the terminal device. The communication unit 603 is configured to support communication between the terminal device and other devices, for example, communication with the network device illustrated in FIG. 5. The terminal device may further include a storage unit 601 configured to store program codes and data of the terminal device.

The processing unit 602 may be a processor or a controller and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in embodiments of the present disclosure can be implemented or executed. The processor may also be a combination for implementing computing functions, for example, one or more microprocessors, a combination of DSP and microprocessor, or the like. The communication unit 603 may be a communication interface, a transceiver circuit, etc. The storage unit 601 may be a memory. When the processing unit 602 is a processor, the communication unit 603 is a communication interface, and the storage unit 601 is a memory, the terminal device involved in embodiments of the disclosure may be the terminal device illustrated in FIG. 4.

In specific implementation, the processing unit 602 is configured to perform any operation performed by the terminal device in above method embodiments, and when data transmission such as transmitting is performed, the communication unit 603 may be selectively invoked to complete corresponding operations, which will be described in detail below.

The processing unit 602 is configured to: determine at least one first network slice, and determine, with the communication unit 603, a first cell to be accessed according to the at least one first network slice.

As can be seen, in embodiments of the disclosure, the terminal device determines the at least one first network slice, and determines the first cell to be accessed according to the at least one first network slice. As can be seen, the terminal device selects the first cell to be accessed according to the first network slice determined, which realizes network slice-based wireless communication, helps to improve the targeting of cell access, optimizes the wireless communication of the terminal device, and refines the utilization of network resources.

In a possible example, in terms of determining the at least one first network slice, the processing unit 602 is specifically configured to: determine the at least one first network slice preconfigured, determine the at least one first network slice according to a selection operation of a user, or select the at least one first network slice according to a priority of each of multiple network slices preconfigured.

In a possible example, in terms of determining, with the communication unit 603, the first cell to be accessed according to the at least one first network slice, the processing unit 602 is specifically configured to: transmit, with a NAS layer, indication information corresponding to the at least one first network slice to an AS layer, perform, with the AS layer and the communication unit 603, cell search according to the indication information to obtain a first search result, determine, with the AS layer, the first cell according to the first search result and feed back the first cell to the NAS layer, and determine, with the NAS layer, the first cell as a cell to be accessed.

In this possible example, in terms of determining, with the AS layer, the first cell according to the first search result and feeding back the first cell to the NAS layer, the processing unit 602 is specifically configured to: determine, with the AS layer, the first cell according to the first search result, read, with the AS layer and the communication unit 603, SIB information of the first cell, and feed back, with the AS layer, the first cell and information of a second network slice corresponding to the first cell in the SIB information to the NAS layer.

In a possible example, the first cell is a cell that supports network slicing.

In a possible example, after the processing unit 602 performs the cell search with the AS layer and the communication unit 603 according to the indication information, the processing unit 602 is further configured to: feed back, with the AS layer, a second search result of the cell search to the NAS layer, where the second search result is that no cell satisfying the indication information is found.

In this possible example, after the AS layer feeds back the second search result of the cell search to the NAS layer, the processing unit 602 is further configured to: determine, with the NAS layer, a third network slice, and transmit, with the NAS layer, indication information corresponding to the third network slice to the AS layer, where a priority of the third network slice is lower than a priority of the first network slice.

In a possible example, in terms of determining the first cell to be accessed according to the at least one first network slice, the processing unit 602 is specifically configured to: transmit, with a NAS layer, the at least one first network slice to an AS layer, perform, with the AS layer and the communication unit 603, cell search, submit, with the AS layer, a first reference cell as a third search result to the NAS layer when the first reference cell supporting the at least one first network slice is found, and determine, with the NAS layer, the first cell to be accessed according to the third search result.

In this possible example, the processing unit 602 is further configured to: transmit, with the NAS layer, indication information corresponding to the at least one first network slice to the AS layer. In terms of performing, with the AS layer, the cell search, the processing unit 602 is specifically configured to: performing, with the AS layer and the communication unit 603, the cell search according to the indication information.

In a possible example, the third search result includes PLMN information supported by the first reference cell, and in terms of determining, with the NAS layer, the first cell to be accessed according to the third search result, the processing unit 602 is specifically configured to: determine, with the NAS layer, whether the PLMN information supported by the first reference cell is a first type of PLMN, and determine, with the NAS layer, the first reference cell as the first cell to be accessed, if the PLMN information supported by the first reference cell is the first type of PLMN.

In a possible example, after the processing unit 602 performs the cell search with the AS layer and the communication unit 603, the processing unit 602 is further configured to: feed back, with the AS layer, a fourth search result of the cell search to the NAS layer, where the fourth search result is that no cell supporting the at least one first network slice is found.

In a possible example, in terms of determining, with the communication unit 603, the first cell to be accessed according to the at least one first network slice, the processing unit 602 is specifically configured to: transmit, with a NAS layer, a first instruction to an AS layer, perform, with the AS layer and the communication unit 603, cell search according to the first instruction, read, with the AS layer, SIB information of a second reference cell found and feed back a fifth search result to the NAS layer, where the fifth search result includes the second reference cell and corresponding network slice information, and determine, with the NAS layer, the first cell to be accessed according to the at least one first network slice and the fifth search result.

In this possible example, the first instruction includes indication information corresponding to the at least one first network slice.

In a possible example, in terms of determining, with the NAS layer, the first cell to be accessed according to the at least one first network slice and the fifth search result, the processing unit 602 is specifically configured to: detect, with the NAS layer, whether the at least one first network slice matches the network slice information of the second reference cell and determine, with the NAS layer, the second reference cell as the first cell if the at least one first network slice matches the network slice information of the second reference cell.

In this possible example, after detecting, with the NAS layer, whether the at least one first network slice matches the network slice information of the second reference cell, the processing unit 602 is further configured to: transmit, with the NAS layer, a second instruction to the AS layer when detecting that the at least one first network slice fails to match the network slice information of the second reference cell, where the second instruction is used for the AS layer to select a third reference cell according to the second instruction to feed back to the NAS layer.

In a possible example, the fifth search result further includes PLMN information supported by the second reference cell.

In this possible example, in terms of determining, with the NAS layer, the first cell to be accessed according to the at least one first network slice and the fifth search result, the processing unit 602 is specifically configured to: determine, with the NAS layer, the second reference cell as the first cell when detecting that the at least one first network slice matches the network slice information of the second reference cell and the PLMN information supported by the second reference cell is not a second type of PLMN information or is a first type of PLMN information, and determine, with the NAS layer, the second reference cell as the first cell according to first configuration information when detecting that the at least one first network slice fails to match the network slice information of the second reference cell or the PLMN information supported by the second reference cell is the second type of PLMN information or is not the first type of PLMN information.

In this possible example, the first configuration information indicates information of a network slice that the terminal device is allowed to perform on a second type of PLMN, or the first configuration information is a priority relationship between a network slice and a PLMN.

In a possible example, indication information includes a RAT and frequency information corresponding to each first network slice.

In a possible example, indication information is determined by a NAS layer of the terminal device by querying a first mapping relationship according to the at least one first network slice, and the first mapping relationship is a mapping relationship between network slices, RATs, and frequencies.

In a possible example, network slice information supported by the terminal device, a first mapping relationship, and first configuration information are preconfigured in the terminal device, or configured in the terminal device by a network device.

In this possible example, the network slice information supported by the terminal device, the first mapping relationship, and the first configuration information are transmitted by the network device to the terminal device through a registration reception message during location-update initiating of the terminal device, or are transmitted by the network device to the terminal device when receiving a configuration update message of the terminal device.

Figure 7:
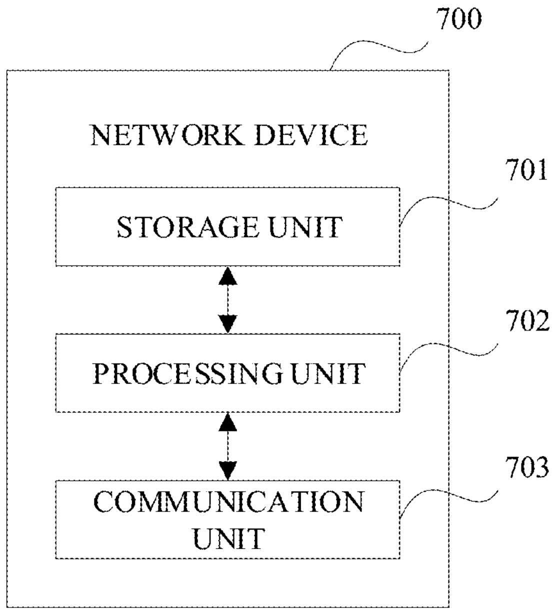
FIG. 7 is a block diagram of functional units of a network device provided in embodiments of the disclosure.

In the case of using the integrated unit, FIG. 7 illustrates a block diagram of possible functional units of the network device involved in the above embodiments. The network device 700 includes a processing unit 702 and a communication unit 703. The network device 700 further includes a processing unit 702. The processing unit 702 is configured to control and manage operations of the network device. The communication unit 703 is configured to support communication between the network device and other devices, for example, communication with the terminal device illustrated in FIG. 4. The network device may further include a storage unit 701 configured to store program codes and data of the network device.

The processing unit 702 may be a processor or a controller and may be, for example, a CPU, a general-purpose processor, a DSP, an ASIC, a FPGA, or other programmable logic devices, transistor logic devices, hardware components, or a combination thereof. Various exemplary logic blocks, modules, and circuits disclosed in embodiments of the present disclosure can be implemented or executed. The processor may also be a combination for implementing computing functions, for example, one or more microprocessors, a combination of DSP and microprocessor, or the like. The communication unit 703 may be a communication interface, a transceiver circuit, etc. The storage unit 701 may be a memory. When the processing unit 702 is a processor, the communication unit 703 is a communication interface, and the storage unit 701 is a memory, the network device involved in embodiments of the present application may be the network device illustrated in FIG. 5.

In specific implementation, the processing unit 702 is configured to perform any operation performed by the network device in above method embodiments, and when data transmission such as transmitting is performed, the communication unit 703 may be selectively invoked to complete corresponding operations, which will be described in detail below.

The processing unit 702 is configured to: transmit, with the communication unit, first information to a terminal device when receiving a first message, where the first information includes at least one piece of network slice information, the network slice information is used for the terminal device to determine at least one first network slice and determine a first cell to be accessed according to the at least one first network slice, and the first message is a location update message or a configuration update message initiated by the terminal device.

As can be seen, in embodiments of the disclosure, the network device transmits the first information to the terminal device when receiving the first message, where the first information includes the at least one piece of network slice information, the network slice information is used for the terminal device to determine the at least one first network slice and determine the first cell to be accessed according to the at least one first network slice, and the first message is the location update message or the configuration update message initiated by the terminal device. As can be seen, the network device transmits the network slice information to the terminal device, so that the terminal device can determine the first cell to be accessed according to the first network slice determined, which realizes network slice-based wireless communication, helps to improve the targeting of cell access, optimizes the wireless communication of the terminal device, and refines the utilization of network resources.

In a possible example, the first information further includes a first mapping relationship and/or first configuration information, the first mapping relationship is a mapping relationship between network slices, RATs, and frequencies, and the first configuration information indicates service information corresponding to the at least one network slice that the terminal device is allowed to perform on a second type of PLMN, or the first configuration information is a priority relationship between a network slice and a PLMN.

Embodiments of the disclosure further provides a chip. The chip includes a processor configured to execute computer programs stored in a memory, to cause a device equipped with the chip to perform some or all of the operations described for the terminal device in above method embodiments.

Embodiments of the disclosure further provides a chip. The chip includes a processor configured to execute computer programs stored in a memory, to cause a device equipped with the chip to perform some or all of the operations described for the network device in above method embodiments.

Embodiments of the disclosure further provide a computer-readable storage medium. The computer-readable storage medium is configured to store computer programs for electronic data interchange. The computer programs are operable with a computer to perform some or all of the operations described for the terminal device in above method embodiments.

Embodiments of the disclosure further provide a computer-readable storage medium. The computer-readable storage medium is configured to store computer programs for electronic data interchange. The computer programs are operable with a computer to perform some or all of the operations described for the network device in above method embodiments.

Embodiments of the disclosure further provide a computer program product. The computer program product includes computer programs. The computer programs are operable with a computer to perform some or all of the operations described for the terminal device in above method embodiments. The computer program product may be a software installation package.

Embodiments of the disclosure further provide a computer program product. The computer program product includes computer programs. The computer programs are operable with a computer to perform some or all of the operations described for the network device in above method embodiments. The computer program product may be a software installation package.

The steps of the method or algorithm described in embodiments of the present application may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, so that the processor can read information from the storage medium and write information to the storage medium. The storage medium can also be a component of the processor. The processor and the storage medium may be located in an ASIC. In addition, the ASIC can be located in an access network device, a target network device, or a core network device. Of course, the processor and the storage medium may also be present as discrete components in the access network device, the target network device, or the core network device.

Those skilled in the art will appreciate that, all or part of functions described in one or more of the foregoing embodiments can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the embodiments of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The purposes, technical solutions, and beneficial effects of embodiments of the present application are described in detail in detailed description. It should be understood that, the above only illustrates specific implementation manners of embodiments of the present application, and is not intended for limiting the scope of embodiments of the present application. Any modifications, equivalent replacements, improvements, and the like made on the basis of the technical solutions of embodiments of the present application should fall within the scope of embodiments of the present application.

What is claimed is:

1. A method for network slice-based cell determination, comprising:

determining, by a terminal device, at least one first network slice; and determining, by the terminal device, a first cell to be accessed according to the at least one first network slice, wherein:

determining, by the terminal device, the first cell to be accessed according to the at least one first network slice comprises:

transmitting, by a non-access stratum (NAS) layer of the terminal device, indication information corresponding to the at least one first network slice to an access stratum (AS) layer;

performing, by the AS layer of the terminal device, cell search according to the indication information to obtain a first search result;

determining, by the AS layer of the terminal device, the first cell according to the first search result and feeding back the first cell to the NAS layer; and determining, by the NAS layer of the terminal device, the first cell as a cell to be accessed, wherein after performing, by the AS layer of the terminal device, the cell search according to the indication information, the method further comprises:

feeding back, by the AS layer of the terminal device, a second search result of the cell search to the NAS layer, wherein the second search result is that no cell satisfying the indication information is found.

2. The method of claim 1, wherein determining, by the AS layer of the terminal device, the first cell according to the first search result and feeding back the first cell to the NAS layer comprises:

determining, by the AS layer of the terminal device, the first cell according to the first search result;

reading, by the AS layer of the terminal device, system information block (SIB) information of the first cell; and feeding back, by the AS layer of the terminal device, the first cell and information of a second network slice corresponding to the first cell in the SIB information to the NAS layer, wherein the first cell is a cell that supports network slicing.

3. The method of claim 1, wherein after feeding back, by the AS layer of the terminal device, the second search result of the cell search to the NAS layer, the method further comprises:

determining, by the NAS layer of the terminal device, a third network slice; and transmitting, by the NAS layer of the terminal device, indication information corresponding to the third network slice to the AS layer, wherein a priority of the third network slice is lower than a priority of the first network slice.

4. The method of claim 1, wherein determining, by the terminal device, the first cell to be accessed according to the at least one first network slice comprises:

transmitting, by the NAS layer of the terminal device, the at least one first network slice to the AS layer;

performing, by the AS layer of the terminal device, cell search;

submitting, by the AS layer of the terminal device, a first reference cell as a third search result to the NAS layer when the first reference cell supporting the at least one first network slice is found; and determining, by the NAS layer of the terminal device, the first cell to be accessed according to the third search result.

5. The method of claim 4, further comprising:

transmitting, by the NAS layer of the terminal device, indication information corresponding to the at least one first network slice to the AS layer;

wherein performing, by the AS layer of the terminal device, the cell search comprises:

performing, by the AS layer of the terminal device, the cell search according to the indication information.

6. The method of claim 4, wherein the third search result comprises public land mobile network (PLMN) information supported by the first reference cell, and determining, by the NAS layer of the terminal device, the first cell to be accessed according to the third search result comprises:

determining, by the NAS layer of the terminal device, whether the PLMN information supported by the first reference cell is a first type of PLMN; and determining, by the NAS layer of the terminal device, the first reference cell as the first cell to be accessed, if the PLMN information supported by the first reference cell is the first type of PLMN.

7. The method of claim 4, wherein after performing, by the AS layer of the terminal device, the cell search, the method further comprises:

feeding back, by the AS layer of the terminal device, a fourth search result of the cell search to the NAS layer, wherein the fourth search result is that no cell supporting the at least one first network slice is found.

8. The method of claim 1, wherein determining, by the terminal device, the first cell to be accessed according to the at least one first network slice comprises:

transmitting, by the NAS layer of the terminal device, a first instruction to the AS layer;

performing, by the AS layer of the terminal device, cell search according to the first instruction;

reading, by the AS layer of the terminal device, SIB information of a second reference cell found and feeding back a fifth search result to the NAS layer, wherein the fifth search result comprises the second reference cell and corresponding network slice information; and determining, by the NAS layer of the terminal device, the first cell to be accessed according to the at least one first network slice and the fifth search result, wherein the first instruction comprises indication information corresponding to the at least one first network slice.

9. The method of claim 8, wherein determining, by the NAS layer of the terminal device, the first cell to be accessed according to the at least one first network slice and the fifth search result comprises:

detecting, by the NAS layer of the terminal device, whether the at least one first network slice matches the network slice information of the second reference cell; and determining, by the NAS layer of the terminal device, the second reference cell as the first cell if the at least one first network slice matches the network slice information of the second reference cell.

10. The method of claim 9, wherein after detecting, by the NAS layer of the terminal device, whether the at least one first network slice matches the network slice information of the second reference cell, the method further comprises:

transmitting, by the NAS layer of the terminal device, a second instruction to the AS layer when detecting that the at least one first network slice fails to match the network slice information of the second reference cell, wherein the second instruction is used for the AS layer to select a third reference cell according to the second instruction to feed back to the NAS layer.

11. The method of claim 8, wherein the fifth search result further comprises PLMN information supported by the second reference cell.

12. The method of claim 11, wherein determining, by the NAS layer of the terminal device, the first cell to be accessed according to the at least one first network slice and the fifth search result comprises:

determining, by the NAS layer of the terminal device, the second reference cell as the first cell when detecting that the at least one first network slice matches the network slice information of the second reference cell and the PLMN information supported by the second reference cell is not a second type of PLMN information or is a first type of PLMN information; and determining, by the NAS layer of the terminal device, the second reference cell as the first cell according to first configuration information when detecting that the at least one first network slice fails to match the network slice information of the second reference cell or the PLMN information supported by the second reference cell is the second type of PLMN information or is not the first type of PLMN information, wherein the first configuration information indicates information of a network slice that the terminal device is allowed to perform on a second type of PLMN, or the first configuration information is a priority relationship between a network slice and a PLMN.

13. The method of claim 1, wherein the indication information comprises a radio access technology (RAT) and frequency information corresponding to each first network slice, the indication information is determined by the NAS layer of the terminal device by querying a first mapping relationship according to the at least one first network slice, and the first mapping relationship is a mapping relationship between network slices, RATs, and frequencies.

14. The method of claim 1, wherein network slice information supported by the terminal device, a first mapping relationship, and first configuration information are preconfigured in the terminal device, or configured in the terminal device by a network device.

15. The method of claim 14, wherein the network slice information supported by the terminal device, the first mapping relationship, and the first configuration information are transmitted by the network device to the terminal device through a registration reception message during location-update initiating of the terminal device, or are transmitted by the network device to the terminal device when receiving a configuration update message of the terminal device.

16. The method of claim 1, wherein determining, by the terminal device, the at least one first network slice comprises:

determining, by the terminal device, the at least one first network slice preconfigured;

determining, by the terminal device, the at least one first network slice according to a selection operation of a user; or selecting, by the terminal device, the at least one first network slice according to a priority of each of a plurality of network slices preconfigured.

17. A terminal device, comprising:

a memory configured to store computer programs; and a processor configured to execute the computer programs stored in the memory to cause the terminal device to:

determine at least one first network slice; and determine a first cell to be accessed according to the at least one first network slice, wherein:

determining the first cell to be accessed according to the at least one first network slice comprises:

transmitting, by a non-access stratum (NAS) layer of the terminal device, indication information corresponding to the at least one first network slice to an access stratum (AS) layer;

performing, by the AS layer of the terminal device, cell search according to the indication information to obtain a first search result;

determining, by the AS layer of the terminal device, the first cell according to the first search result and feeding back the first cell to the NAS layer; and determining, by the NAS layer of the terminal device, the first cell as a cell to be accessed, wherein after performing, by the AS layer of the terminal device, the cell search according to the indication information, the processor is further configured to cause the terminal device to:

feed back, by the AS layer of the terminal device, a second search result of the cell search to the NAS layer, wherein the second search result is that no cell satisfying the indication information is found.

18. A network device, comprising:

a memory configured to store computer programs; and a processor configured to execute the computer programs stored in the memory to cause the network device to:

transmit first information to a terminal device when receiving a first message, wherein the first information comprises at least one piece of network slice information, the network slice information is used for the terminal device to determine at least one first network slice and determine a first cell to be accessed according to the at least one first network slice, and the first message is a location update message or a configuration update message initiated by the terminal device, wherein:

the network slice information is used for the terminal device to determine the first cell to be accessed according to the at least one first network slice by:

transmitting, by a non-access stratum (NAS) layer of the terminal device, indication information corresponding to the at least one first network slice to an access stratum (AS) layer;

performing, by the AS layer of the terminal device, cell search according to the indication information to obtain a first search result;

determining, by the AS layer of the terminal device, the first cell according to the first search result and feeding back the first cell to the NAS layer; and determining, by the NAS layer of the terminal device, the first cell as a cell to be accessed, wherein after performing, by the AS layer of the terminal device, the cell search according to the indication information, the network slice information is further used for the terminal device to:

feed back, by the AS layer of the terminal device, a second search result of the cell search to the NAS layer, wherein the second search result is that no cell satisfying the indication information is found.

* * * * *